United States Patent
Wang et al.

(10) Patent No.: US 6,701,749 B2
(45) Date of Patent: Mar. 9, 2004

(54) VACUUM IG WINDOW UNIT WITH EDGE SEAL AT LEAST PARTIALLY DIFFUSED AT TEMPER AND COMPLETED VIA MICROWAVE CURING, AND CORRESPONDING METHOD OF MAKING THE SAME

(75) Inventors: Yei-Ping H. Wang, Troy, MI (US); Anthony V. Longobardo, Howell, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 249 days.

(21) Appl. No.: 09/777,858

(22) Filed: Feb. 7, 2001

(65) Prior Publication Data

US 2002/0035852 A1 Mar. 28, 2002

Related U.S. Application Data

(63) Continuation-in-part of application No. 09/722,008, filed on Nov. 27, 2000, now Pat. No. 6,558,494, which is a continuation-in-part of application No. 09/670,559, filed on Sep. 27, 2000, now Pat. No. 6,478,911.

(51) Int. Cl.[7] ............................................. C03C 27/06
(52) U.S. Cl. ..................... 65/41; 65/43; 65/58; 156/99; 156/104; 156/109
(58) Field of Search ................................ 65/41, 42, 58, 65/36, 114, 152, 43; 156/99, 104, 109

(56) References Cited

U.S. PATENT DOCUMENTS

| | | | |
|---|---|---|---|
| 49,167 | A | 1/1865 | Stetson |
| 1,370,974 | A | 3/1921 | Kirlin |
| 1,448,351 | A | 3/1923 | Kirlin |

(List continued on next page.)

FOREIGN PATENT DOCUMENTS

| | | |
|---|---|---|
| DE | 2520062 | 11/1976 |
| DE | 2951350 | 7/1981 |
| DE | 38 24 129 A1 | 1/1989 |
| EP | 0047725 | 12/1985 |
| EP | 0 420 638 A1 | 4/1991 |
| EP | 0489042 | 6/1992 |
| EP | 0645516 | 3/1995 |
| FR | 2277964 | 7/1973 |
| FR | 2483564 | 6/1980 |
| FR | 2 482 161 | 11/1981 |
| WO | 9700335 | 1/1997 |
| WO | WO 01/23700 | 4/2001 |

OTHER PUBLICATIONS

Solar Energy vol. 63, No. 4, pp. 243–249, 1998 "Fabrication of Evacuated Glazing at Low Temperature" Griffiths et al.
Solar Energy vol. 62, No. 3, pp. 189–213, 1998 "Current Status of the Science and Technology of Vacuum Glazing" Collins et al.
"Thermal Outgassing of Vacuum Glazing", Lenzen et al., pp. 1–31.

(List continued on next page.)

*Primary Examiner*—Sean Vincent
(74) *Attorney, Agent, or Firm*—Nixon & Vanderhye P.C.

(57) ABSTRACT

A vacuum insulating glass (IG) unit and method of manufacturing the same. A peripheral or edge seal (11) of a vacuum IG unit is formed utilizing microwave energy (17) in order to enable tempered glass sheets (2, 3) of the IG unit to retain a significant portion of their original temper strength. In certain exemplary embodiments, the edge seal may be formed of glass frit or solder glass. In certain embodiments, at least a portion (12, 12a, 301) of the edge seal material may be deposited on one or both substrates prior to a thermal tempering process so that during tempering the edge seal material is permitted to diffuse into (i.e., bond to) the glass substrate(s) (2, 3). Optionally, additional edge seal material (303) may be added after tempering. The final edge seal (11) is preferably formed via microwave heating (17) of the edge seal material.

26 Claims, 11 Drawing Sheets

U.S. PATENT DOCUMENTS

| | | | |
|---|---|---|---|
| 1,774,860 | A | 9/1930 | Wendler et al. |
| 2,011,557 | A | 8/1935 | Anderegg |
| 2,303,897 | A | 12/1942 | Smith |
| 2,962,409 | A | 11/1960 | Ludlow et al. |
| 3,441,924 | A | 4/1969 | Peek et al. |
| 3,742,600 | A | 7/1973 | Lowell |
| 3,857,161 | A | 12/1974 | Hutchins, IV |
| 3,902,883 | A | 9/1975 | Bayer |
| 3,912,365 | A | 10/1975 | Lowell |
| 3,936,553 | A | 2/1976 | Rowe |
| 3,959,577 | A | 5/1976 | Frink |
| 3,990,201 | A | 11/1976 | Falbel |
| 4,064,300 | A | 12/1977 | Bhangu |
| 4,130,408 | A | 12/1978 | Crossland et al. |
| 4,130,452 | A | 12/1978 | Indri |
| 4,305,982 | A | 12/1981 | Hirsch |
| 4,393,105 | A | 7/1983 | Kreisman |
| 4,422,280 | A | 12/1983 | Mertin et al. |
| 4,486,482 | A | 12/1984 | Kobayashi et al. |
| 4,514,450 | A | 4/1985 | Nowobilski et al. |
| 4,542,611 | A | 9/1985 | Day |
| 4,586,289 | A | 5/1986 | Jaeger |
| 4,598,520 | A | 7/1986 | Ellstrom |
| 4,681,616 | A | 7/1987 | McMaster |
| 4,683,154 | A | 7/1987 | Benson et al. |
| 4,780,164 | A | 10/1988 | Rueckheim et al. |
| 4,786,344 | A | 11/1988 | Beuther |
| 4,822,649 | A | 4/1989 | Canaud et al. |
| 4,824,215 | A | 4/1989 | Joseph et al. |
| 4,853,264 | A | 8/1989 | Vincent et al. |
| 4,865,672 | A | 9/1989 | Delbeck et al. |
| 4,874,461 | A | 10/1989 | Sato et al. |
| 4,886,095 | A | 12/1989 | Lisec |
| 4,888,038 | A | 12/1989 | Herrington et al. |
| 4,909,874 | A | 3/1990 | Rueckheim |
| 4,909,875 | A | 3/1990 | Canaud et al. |
| 4,924,243 | A | 5/1990 | Sato et al. |
| 4,928,448 | A | 5/1990 | Phillip |
| 4,983,429 | A | 1/1991 | Takayanagi et al. |
| 5,017,252 | A | 5/1991 | Aldrich et al. |
| 5,027,574 | A | 7/1991 | Phillip |
| H975 | H | * 11/1991 | Selkowitz et al. |
| 5,124,185 | A | 6/1992 | Kerr et al. |
| 5,157,893 | A | 10/1992 | Benson et al. |
| 5,175,975 | A | 1/1993 | Benson et al. |
| 5,234,738 | A | 8/1993 | Wolf |
| 5,247,764 | A | 9/1993 | Jeshurun et al. |
| 5,270,084 | A | 12/1993 | Parker |
| 5,271,973 | A | 12/1993 | Huether |
| 5,313,761 | A | 5/1994 | Leopold |
| 5,315,797 | A | 5/1994 | Glover et al. |
| 5,366,574 | A | 11/1994 | Lenhardt et al. |
| 5,399,406 | A | 3/1995 | Matsuo et al. |
| 5,489,321 | A | 2/1996 | Tracy et al. |
| 5,494,715 | A | 2/1996 | Glover |
| 5,499,128 | A | 3/1996 | Hasegawa et al. |
| 5,596,981 | A | 1/1997 | Soucy |
| 5,657,607 | A | 8/1997 | Collins et al. |
| 5,664,395 | A | 9/1997 | Collins et al. |
| 5,739,882 | A | 4/1998 | Shimizu et al. |
| 5,755,845 | A | 5/1998 | Woodward et al. |
| 5,855,638 | A | 1/1999 | Demars |
| 5,891,536 | A | 4/1999 | Collins et al. |
| 5,897,927 | A | 4/1999 | Tsai et al. |
| 5,902,652 | A | 5/1999 | Collins et al. |
| 6,037,710 | A | 3/2000 | Poole et al. |
| 6,040,564 | A | 3/2000 | Ueda et al. |
| 6,049,370 | A | 4/2000 | Smith, Jr. et al. |
| 6,071,575 | A | 6/2000 | Collins et al. |
| 6,109,994 | A | 8/2000 | Cho et al. |
| 6,336,984 | B1 | 1/2002 | Aggas |
| 6,365,242 | B1 | 4/2002 | Veerasamy |
| 6,478,911 | B1 | 11/2002 | Wang et al. |
| 2002/0046797 | A1 | 4/2002 | Collins |

OTHER PUBLICATIONS

U.S. patent application Ser. No. 09/722,008, filed Nov. 27, 2000.

U.S. patent application Ser. No. 09/670,559, filed Sep. 27, 2000.

U.S. patent application Ser. No. 09/404,659.

"Temperature–Induced Stresses in Vacuum Glazing Modelling and Experimental Validation" by Simko, et al., Solar Energy, vol. 63, No. 1, pp. 1–21, 1998.

* cited by examiner

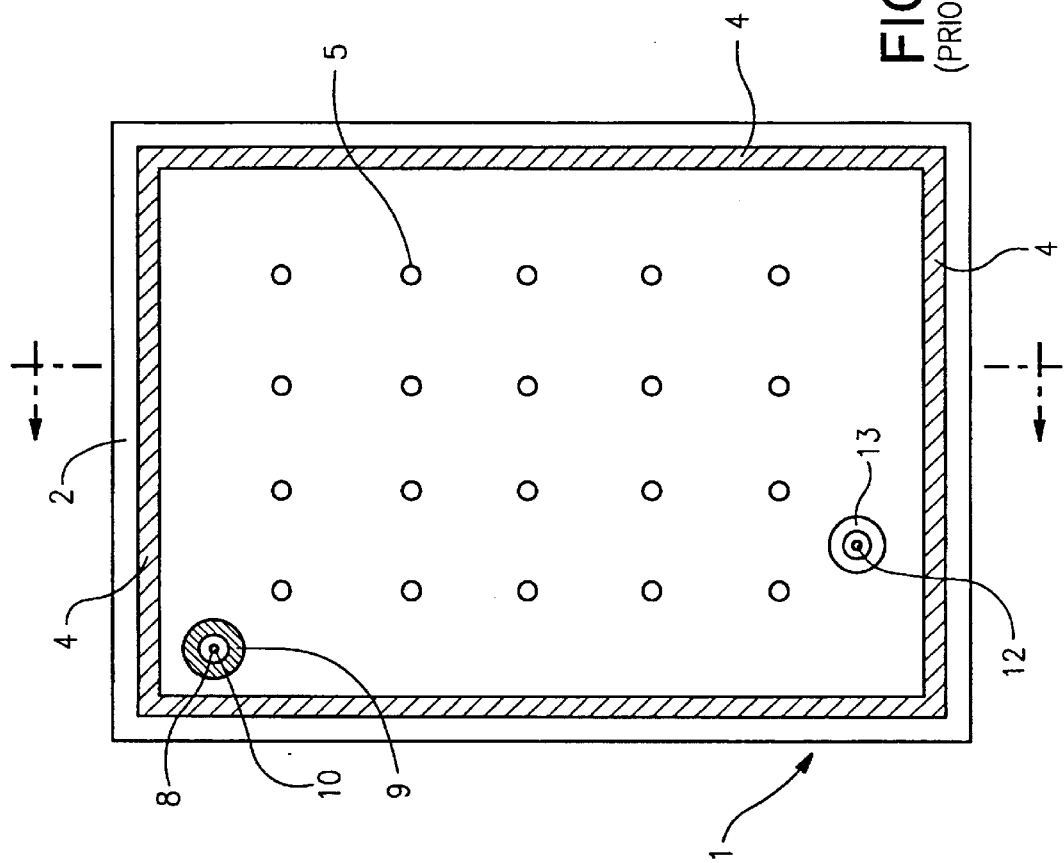
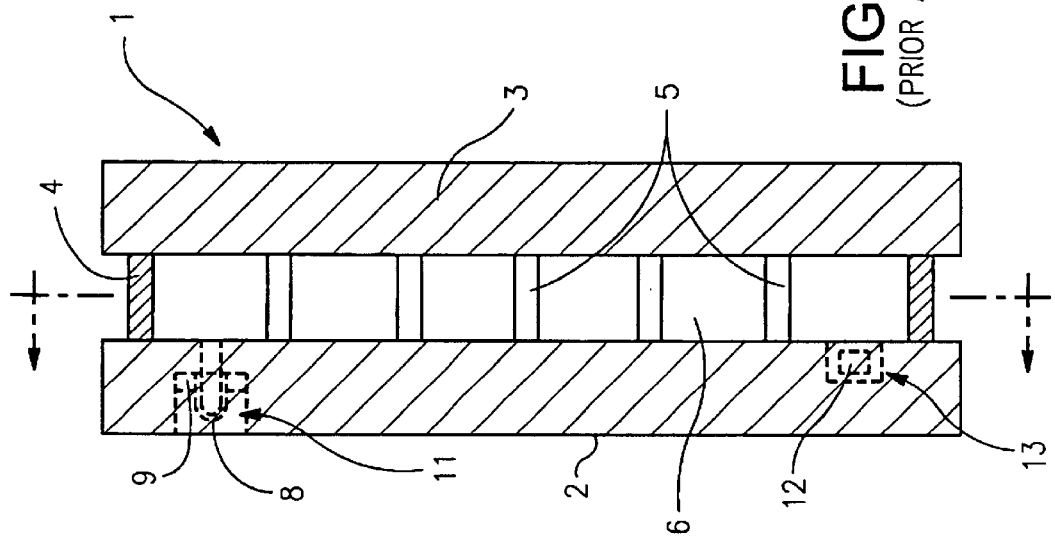

VACUUM IG WINDOW UNIT WITH EDGE SEAL AT LEAST PARTIALLY DIFFUSED AT TEMPER AND COMPLETED VIA MICROWAVE CURING, AND CORRESPONDING METHOD OF MAKING THE SAME

RELATED APPLICATIONS

This application is a continuation-in-part (CIP) application of each of U.S. Ser. No. 09/722,008, filed Nov. 27, 2000 now U.S. Pat. No. 6,558,494, and Ser. No. 09/670,559, filed Sep. 27, 2000 now U.S. Pat. No. 6,478,911, the disclosures of which are all hereby incorporated herein by reference.

This application is related to commonly owned U.S. Ser. Nos. 09/303,550, 09/722,008, 09/348,281, 09/670,559, and 09/404,659 now U.S. Pat. Nos. 6,326,067, 6,558,494, 6,365,242, 6,478,911, 6,336,984 all of which are hereby incorporated herein by reference.

This invention relates to a vacuum insulating glass (IG) unit, and a method of making the same.

BACKGROUND OF THE INVENTION

Vacuum IG units are known in the art. For example, see U.S. Pat. Nos. 5,664,395, 5,657,607, and 5,902,652, the disclosures of which are all hereby incorporated herein by reference.

Prior art FIGS. 1–2 illustrate a conventional vacuum IG unit. IG unit 1 includes two spaced apart glass substrates 2 and 3 which enclose an evacuated or low pressure space 6 therebetween. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6. After evacuation, tube 8 is melted to seal the vacuum. Recess 11 retains sealed tube 8. Optionally, a chemical getter 12 may be included within recess 13.

Conventional vacuum IG units, with their fused solder glass peripheral seals 4, have been manufactured as follows. Glass frit in a solution (ultimately to form solder glass edge seal 4) is initially deposited around the periphery of substrate 2. The other substrate 3 is brought down over top of substrate 2 so as to sandwich spacers 5 and the glass frit/solution therebetween. The entire assembly including sheets 2, 3, the spacers, and the seal material is then heated to a temperature of approximately 500° C. at which point the glass frit melts, wets the surfaces of the glass sheets 2, 3, and ultimately forms hermetic peripheral or edge seal 4. This approximately 500° C. temperature is maintained for from about one to eight hours. After formation of the peripheral/edge seal 4 and the seal around tube 8, the assembly is cooled to room temperature. It is noted that column 2 of U.S. Pat. No. 5,664,395 states that a conventional vacuum IG processing temperature is approximately 500° C. for one hour. Inventor Collins of the '395 patent states in "*Thermal Outgassing of Vacuum Glazing*", by Lenzen, Turner and Collins, that "the edge seal process is currently quite slow: typically the temperature of the sample is increased at 200° C. per hour, and held for one hour at a constant value ranging from 430° C. and 530° C. depending on the solder glass composition." After formation of edge seal 4, a vacuum is drawn via the tube to form low pressure space 6.

Unfortunately, the aforesaid high temperatures and long heating times utilized in the formulation of edge seal 4 are undesirable, especially when it is desired to use a tempered glass substrate(s) 2, 3 in the vacuum IG unit. As shown in FIGS. 3–4, tempered glass loses temper strength upon exposure to high temperatures as a function of heating time. Moreover, such high processing temperatures may adversely affect certain low-E coating(s) that may be applied to one or both of the glass substrates.

FIG. 3 is a graph illustrating how fully thermally tempered plate glass loses original temper upon exposure to different temperatures for different periods of time, where the original center tension stress is 3,200 MU per inch. The x-axis in FIG. 3 is exponentially representative of time in hours (from 1 to 1,000 hours), while the y-axis is indicative of the percentage of original temper strength remaining after heat exposure. FIG. 4 is a graph similar to FIG. 3, except that the x-axis in FIG. 4 extends from zero to one hour exponentially.

Seven different curves are illustrated in FIG. 3, each indicative of a different temperature exposure in degrees Fahrenheit (F.). The different curves/lines are 400° F. (across the top of the FIG. 3 graph), 500° F., 600° F., 700° F., 800° F., 900° F., and 950° F. (the bottom curve of the FIG. 3 graph). A temperature of 900° F. is equivalent to approximately 482° C., which is within the range utilized for forming the aforesaid conventional solder glass peripheral seal 4 in FIGS. 1–2. Thus, attention is drawn to the 900° F. curve in FIG. 3, labeled by reference number 18. As shown, only 20% of the original temper strength remains after one hour at this temperature (900° F. or 482° C.). Such a significant loss (i.e., 80% loss) of temper strength is of course undesirable.

In FIGS. 3–4, it is noted that much better temper strength remains in a thermally tempered sheet when it is heated to a temperature of 800° F. (i.e., about 428° C.) for one hour as opposed to 900° F. for one hour. Such a glass sheet retains about 70% of its original temper strength after one hour at 800° F., which is significantly better than the less than 20% when at 900° F. for the same period of time.

Another advantage associated with not heating up the entire unit for too long is that lower temperature pillar materials may then be used. This may or may not be desirable in some instances.

It will be apparent of those of skill in the art that there exists a need for a vacuum IG unit, and corresponding method of making the same, where a structurally sound hermetic edge seal may be provided between opposing glass sheets without at least certain portions of thermally tempered glass sheet(s)/substrate(s) of the IG unit losing more than about 50% of original temper strength. There also exists a need in the art for a vacuum IG unit including tempered glass sheets, wherein the peripheral seal is formed such that the glass sheets retain more of their original temper strength than with a conventional vacuum IG manufacturing technique where the entire unit is heated in order to form a solder glass edge seal. It is a purpose of this invention to fulfill one or more of the above listed needs in the art.

SUMMARY OF THE INVENTION

An object of this invention is to provide a vacuum IG unit having a peripheral or edge seal formed so that at least certain portion(s) of thermally tempered glass substrates/sheets of the IG unit retain more of their original temper strength than if conventional edge seal forming techniques were used with the solder glass edge seal material.

Another object of this invention is to provide a vacuum IG unit, and method of making the same, wherein at least a portion of the resulting thermally tempered glass substrate(s) retain(s) at least about 50% of original temper strength after formation of the edge seal (e.g., solder glass edge seal).

Another object of this invention is to reduce the amount of post-tempering heating time necessary to form a peripheral/edge seal in a vacuum IG unit.

Yet another object of this invention is to form a hermetic edge seal in a vacuum IG unit by utilizing microwave energy to cure edge seal material. In an exemplary embodiment, glass frit suspended in liquid or solution may be deposited as an edge seal base material on each of first and second annealed glass substrates (e.g., soda-lime-silica float glass substrates). This may be referred to as an initial or first glass frit application. Each of the glass substrates may then be thermally tempered with the edge seal material thereon so that during the thermal tempering process, the edge seal material at least partially diffuses into and/or bonds to the respective glass substrates. This fuses the glass frit edge seal material to the glass substrates (i.e., pre-firing the first glass frit application) while at the same time tempering the substrates. Thereafter, a second application of glass frit may be applied to one or both of the substrates over the pre-fired first glass frit application. Spacers and/or pillars may be sandwiched between the substrates as the substrates are brought together. Then, microwave energy is directed toward the edge seal material in order to heat the same (i.e., heating at least the second glass frit application, and preferably both the first and second glass frit applications) thereby causing the second glass frit edge seal material to fuse to, or bond with, the first or pre-fired glass frit base material on both substrates thereby creating a hermetic edge seal.

In certain embodiments, the first application of glass frit edge seal material is deposited on the respective substrates prior to thermal tempering, because diffusion of solder glass or glass frit into an annealed non-tempered glass substrate may be easier than diffusion of solder glass or glass frit into a tempered glass substrate. Thus, by causing the edge seal material to fuse into the glass substrate(s) during the tempering process yet prior to full tempering of the substrate(s), a better bond of the edge seal to the substrate(s) may be achieved.

Moreover, the use of microwave energy (localized or otherwise) in order to form an edge seal (e.g., using the second glass frit application) enables one or both of the thermally tempered glass sheets/substrates to retain much temper strength because at least certain portions (e.g., central portions) of the glass substrate(s) need not be heated along with the solder glass edge seal material during formation of the edge seal. Moreover, the use of microwave energy in forming the edge seal of a vacuum IG unit can result in reduced processing time as well as a reduced need for capital intensive manufacturing equipment such as ovens, furnaces, or the like.

Another object of this invention is to fulfill one or more of the above listed objects and/or needs.

Generally speaking, certain embodiments of this invention fulfill one or more of the above-listed needs and/or objects by providing a method of making a thermally insulating unit, the method comprising:

provided first and second substrates with a plurality of spacers therebetween; and forming a hermetic peripheral or edge seal at least partially between the first and second substrates using at least microwave energy.

Certain embodiments of this invention further fulfill one or more of the above-listed needs by providing a method of making a thermally insulating glass panel, the method comprising:

depositing a first portion of edge seal material on first and second glass substrates;

thermally tempering the first and second glass substrates with the first portion of edge seal material thereon;

following said tempering, depositing a second portion of edge seal material on at least the first substrate over at least part of the first portion of edge seal material already on the first substrate;

forming a hermetic peripheral or edge seal at least partially between the first and second substrates by at least using microwave energy directed toward at least the second portion of edge seal material so that the second portion of edge seal material bonds to both: a) the first portion of edge seal material on the first substrate, and b) the first portion of edge seal material on the second substrate; and evacuating a space between the first and second substrates so as to form a low pressure area having a pressure less than atmospheric pressure between the first and second substrates.

Certain other embodiments of this invention fulfill one or more of the above-listed needs by providing a thermally insulating panel comprising:

first and second spaced apart substrates having a low pressure space therebetween having a pressure less than atmospheric pressure;

a hermetic seal provided between said first and second substrates; and wherein said seal includes first and second solder glass or glass frit seal portions, at least a portion of said first seal portion having been deposited on said first substrate prior to tempering thereof and said second seal portion having been deposited on one of said substrates following tempering thereof.

IN THE DRAWINGS

FIG. 1 is a prior art cross-sectional view of a conventional vacuum IG unit.

FIG. 2 is a prior art top plan view of the bottom substrate, edge seal, and spacers of the FIG. 1 vacuum IG unit taken along the section line illustrated in FIG. 1.

Figure 3:
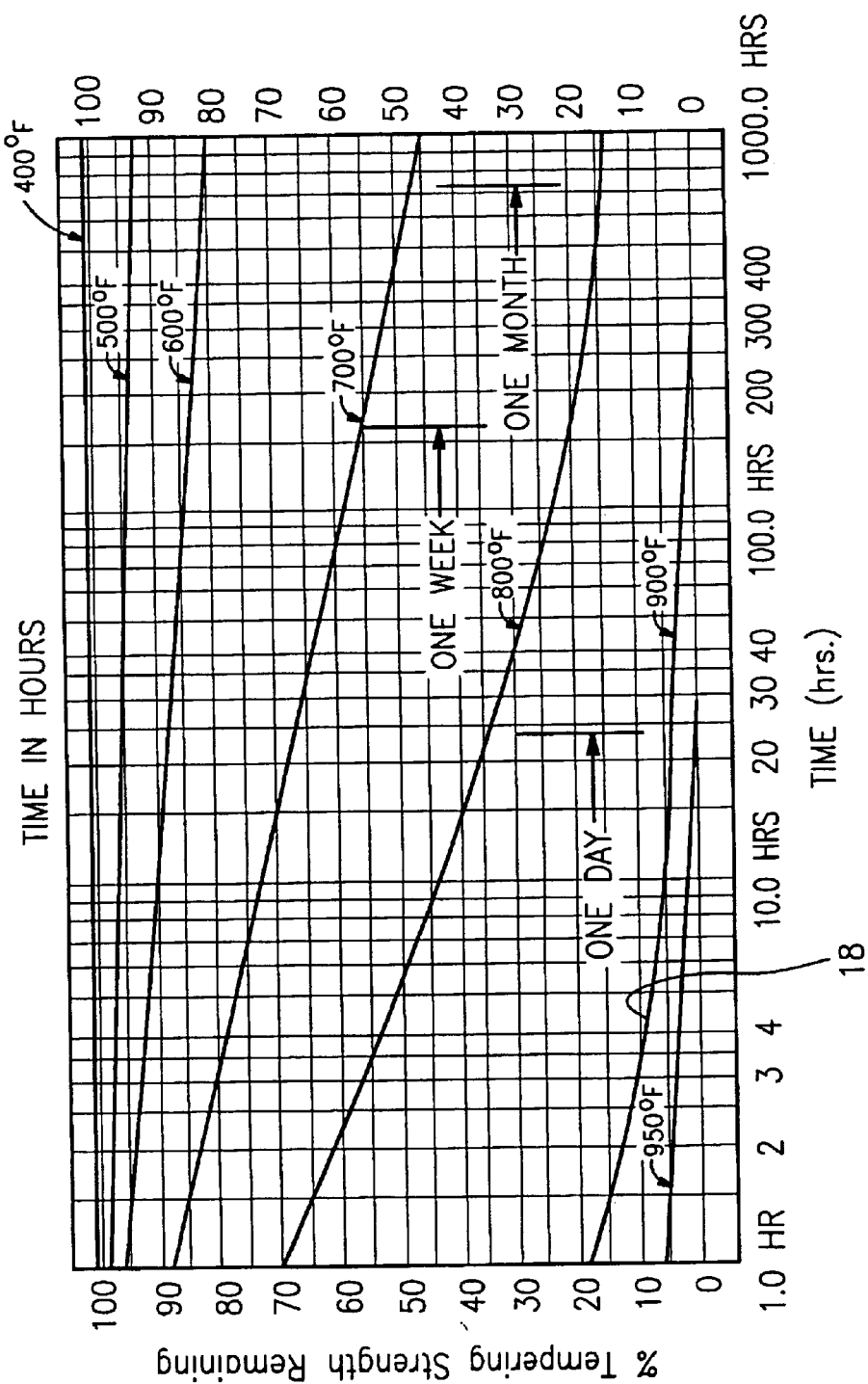
FIG. 3 is a graph correlating time (hours) versus percent tempering strength remaining, illustrating the loss of original temper strength for a thermally tempered sheet of glass after exposure to different temperatures for different periods of time.
Figure 4:
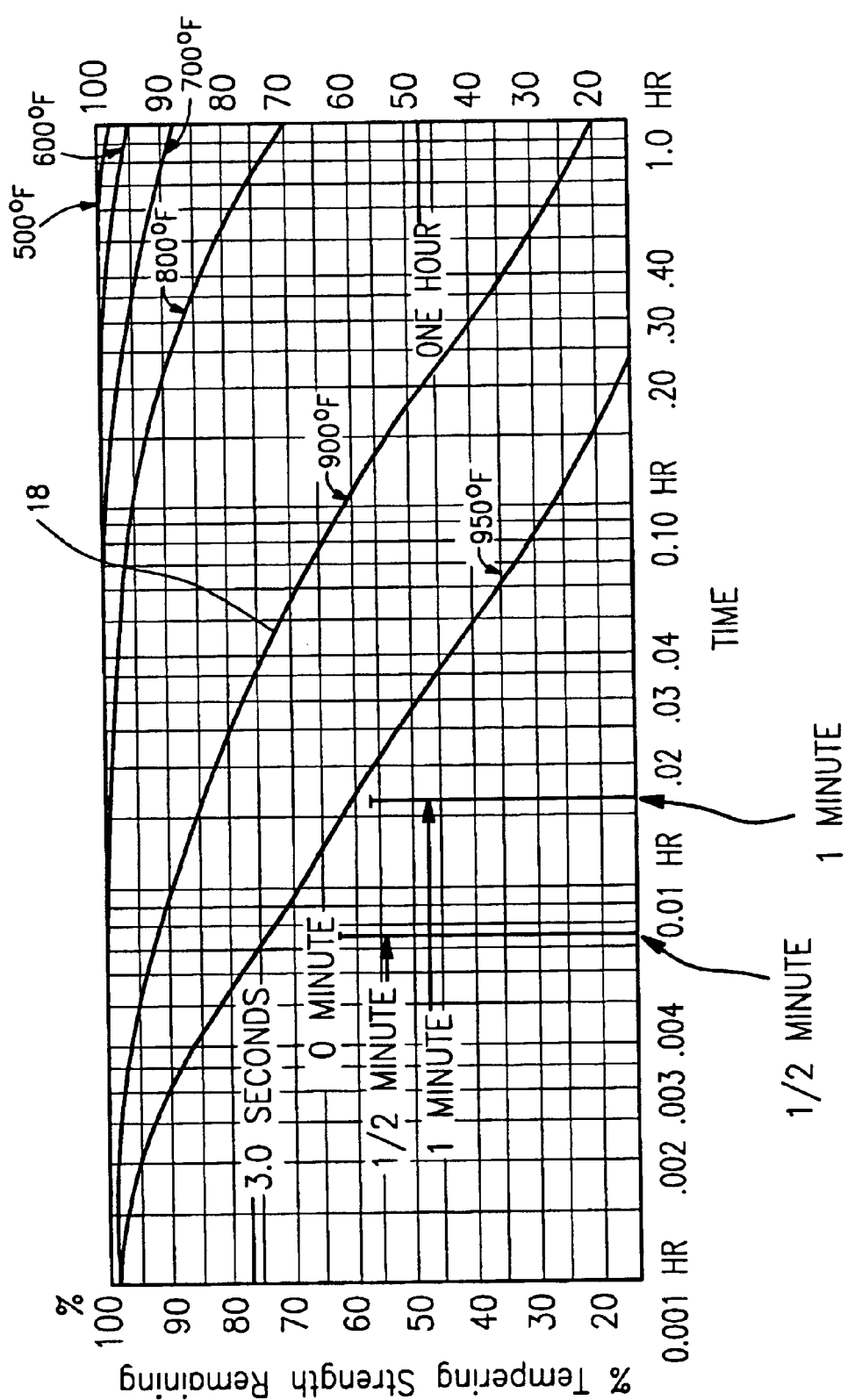
FIG. 4 is a graph correlating time versus percent tempering strength remaining similar to that of FIG. 3 except that a smaller time period is provided on the x-axis.
Figure 5:
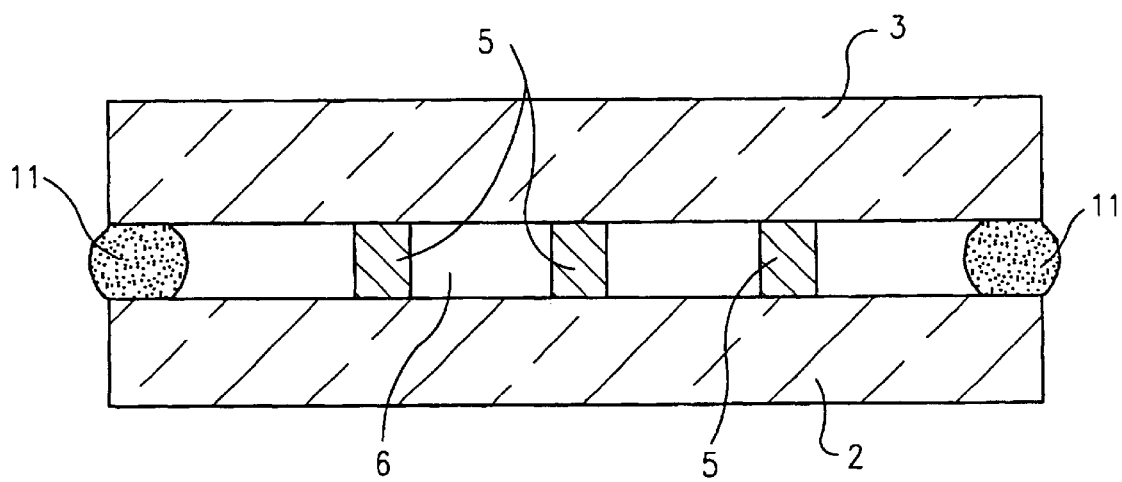
FIG. 5 is a side cross-sectional view of a vacuum IG unit according to an embodiment of this invention.
Figure 6A:
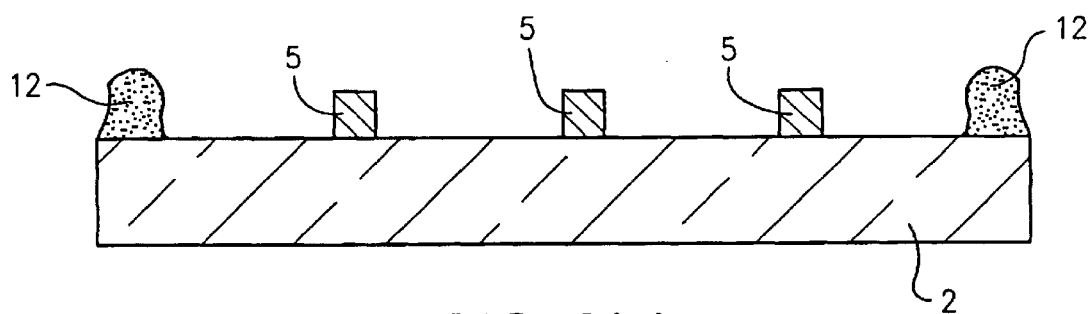
Figure 6B:
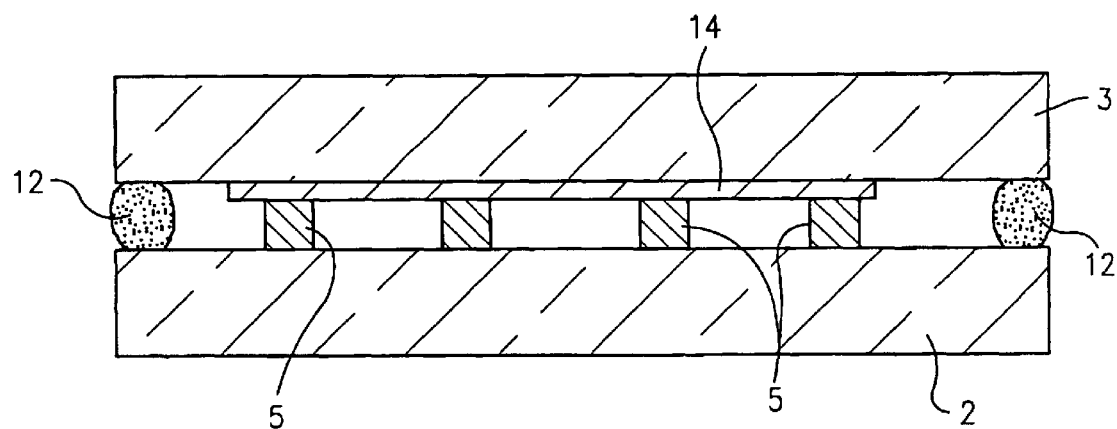
Figure 6C:
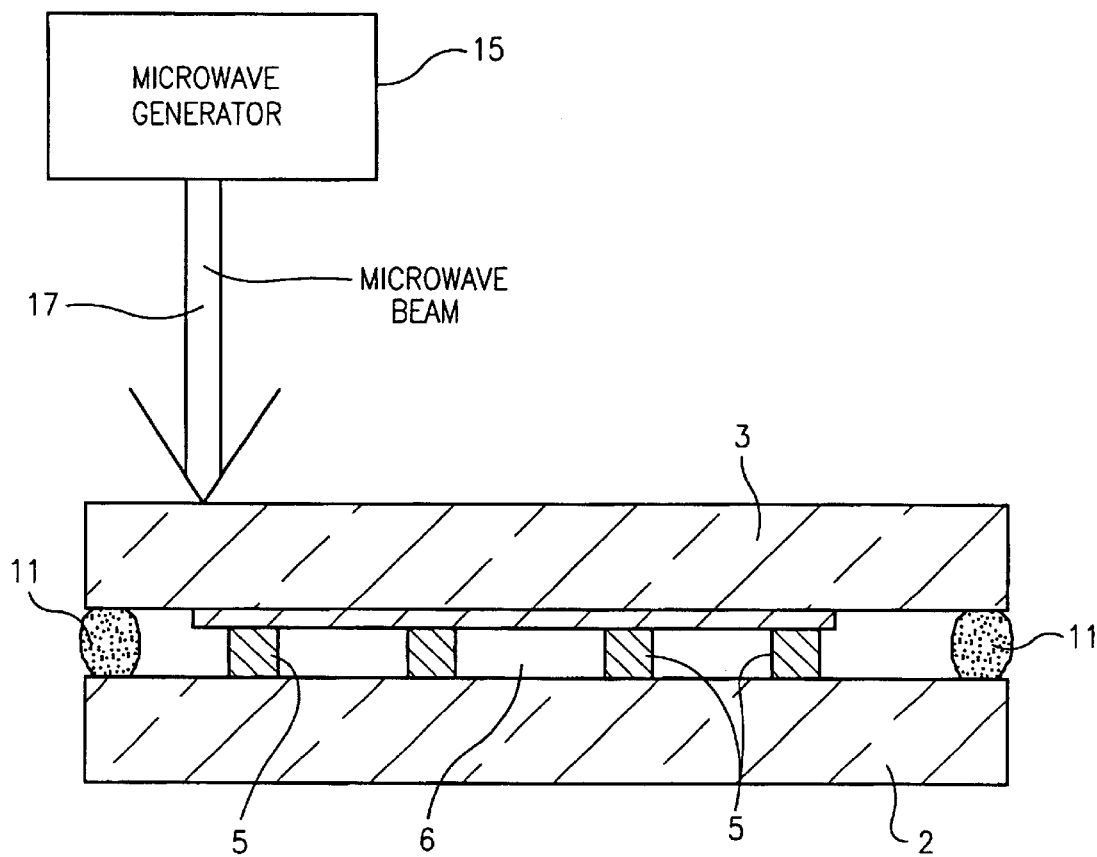

FIGS. 6(*a*) through 6(*c*) illustrate certain manufacturing steps performed during the manufacture of the vacuum IG unit of FIG. 5 according to an embodiment of this invention.

Figure 7:
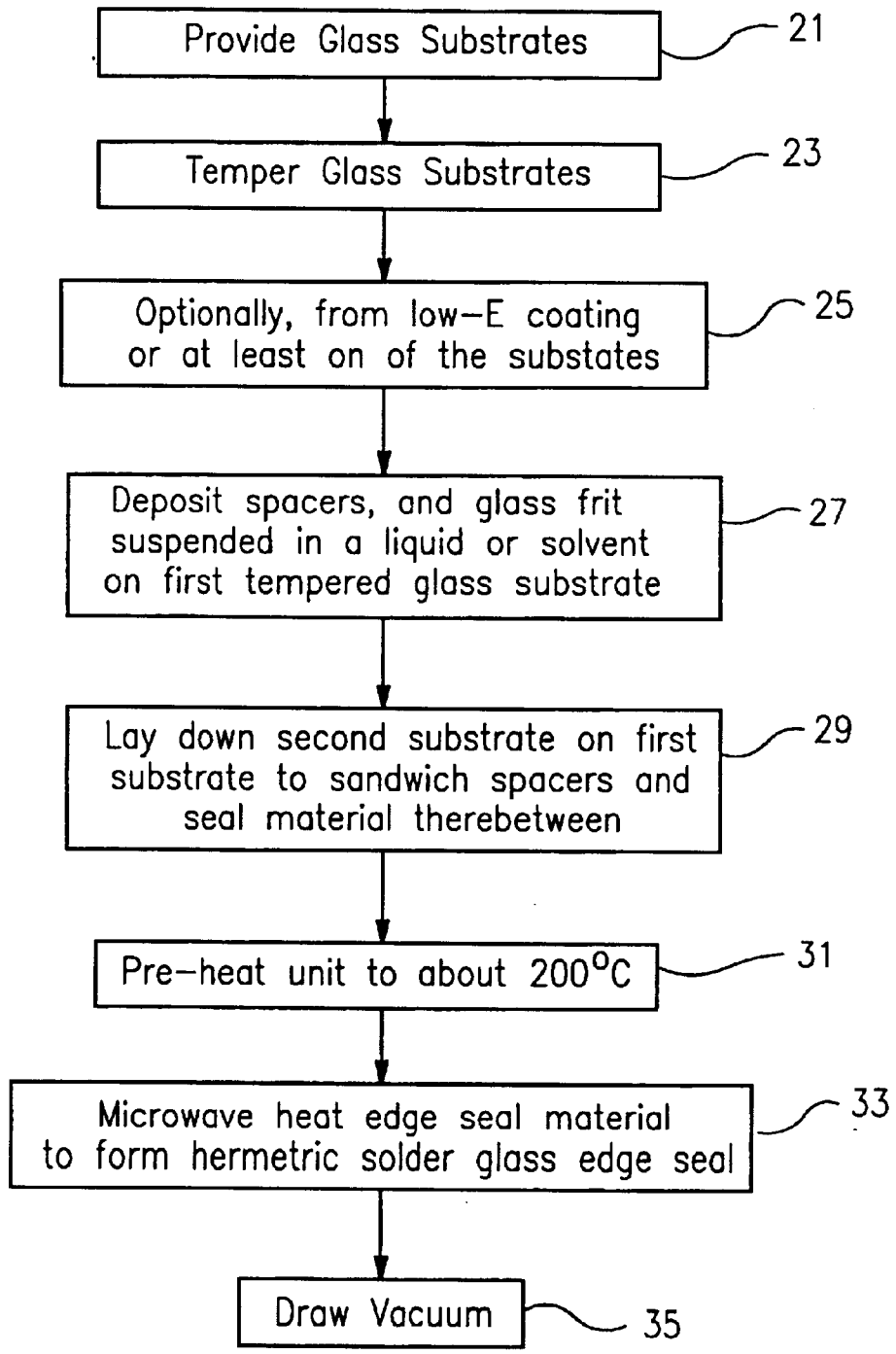

FIG. 7 is a flow chart illustrating certain steps performed according to an embodiment of this invention in forming a vacuum IG window unit.

Figure 8:
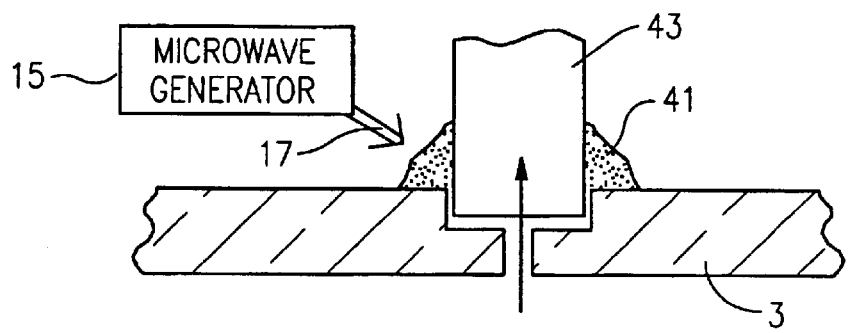

FIG. 8 is a cross sectional view of a portion of a vacuum IG window unit illustrating that a seal around a pump-out tube may be formed using microwave energy according to an embodiment of this invention.

Figure 9:
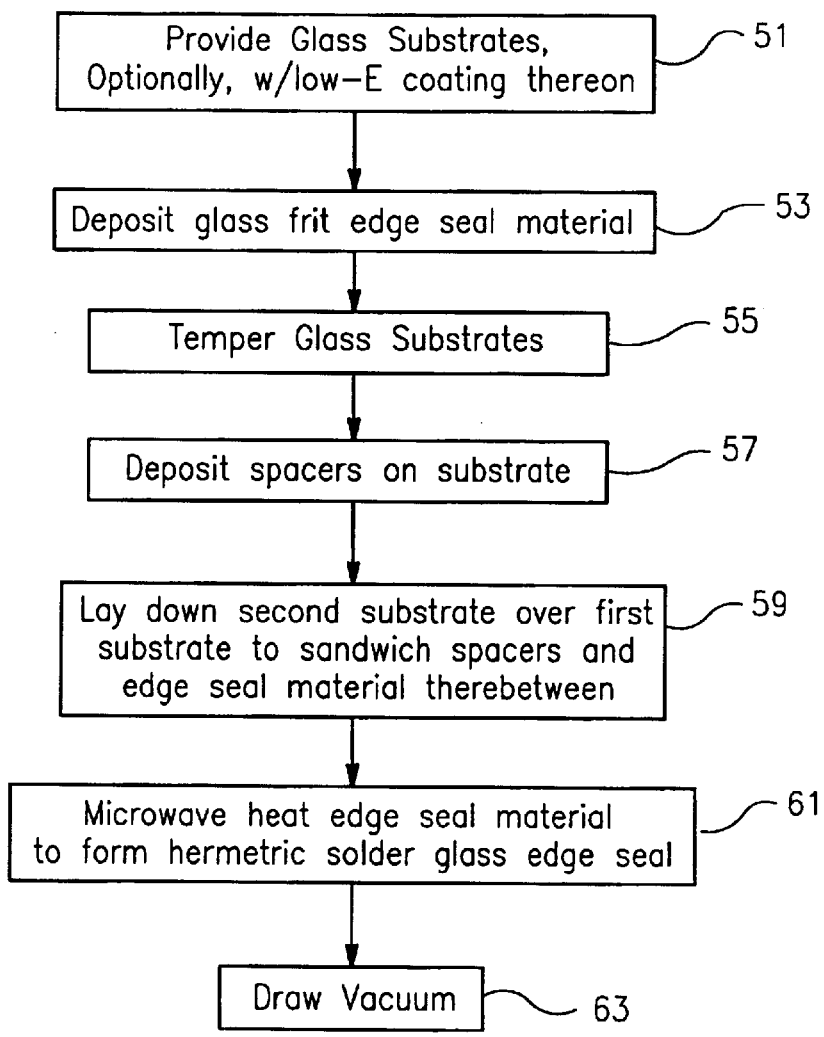

FIG. 9 is a flowchart illustrating certain steps taken in accordance with yet another embodiment of this invention.

Figure 10A:
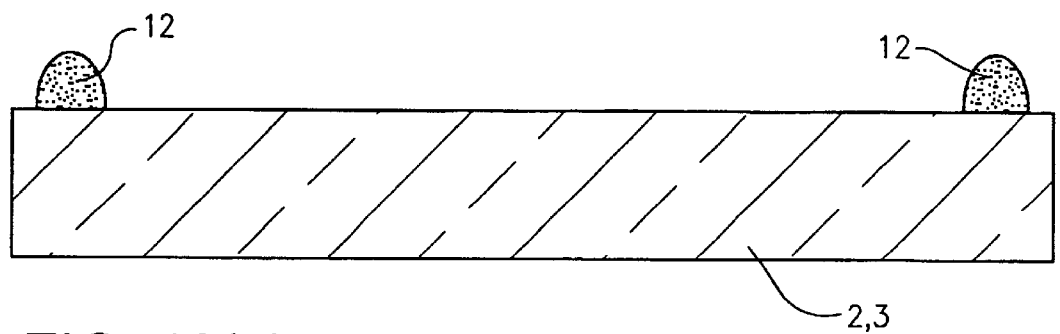
Figure 10B:
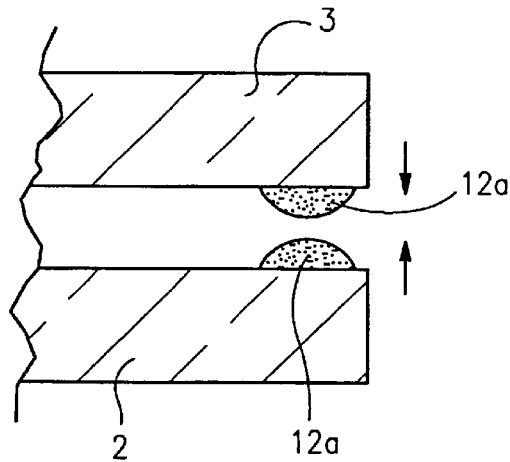
Figure 10C:
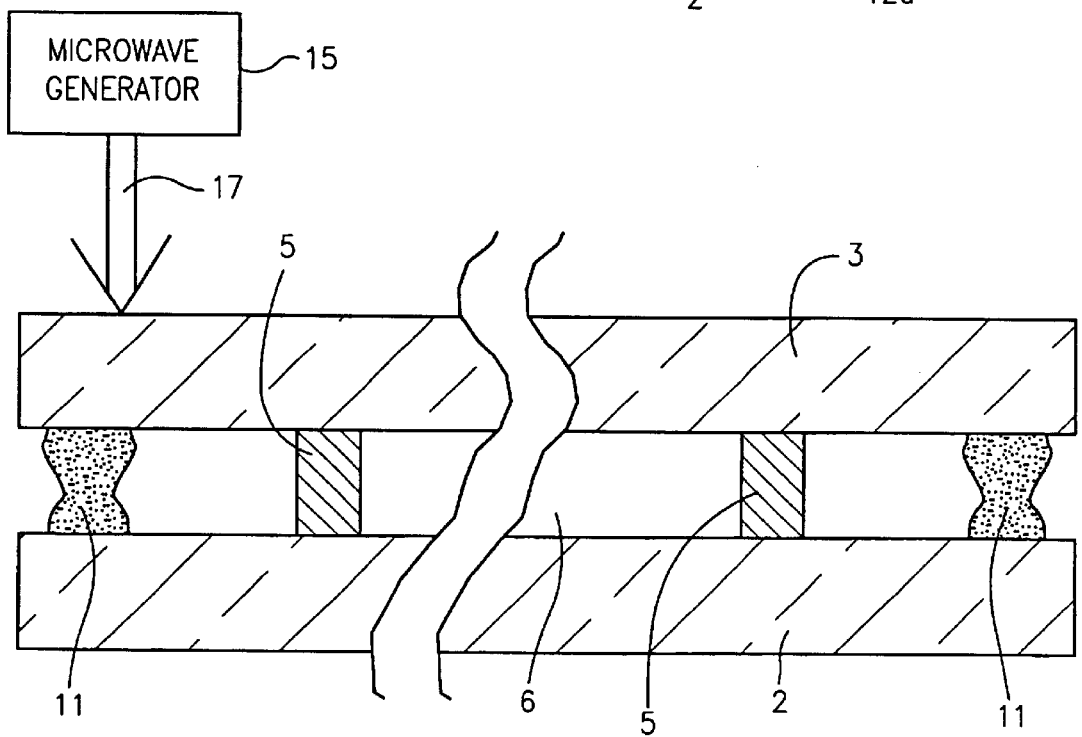

FIGS. 10(a) through 10(c) are side partial cross sectional view of one or two glass substrates of at least a portion of a VIG unit during the manufacture of the same according to another embodiment of this invention.

Figure 11:
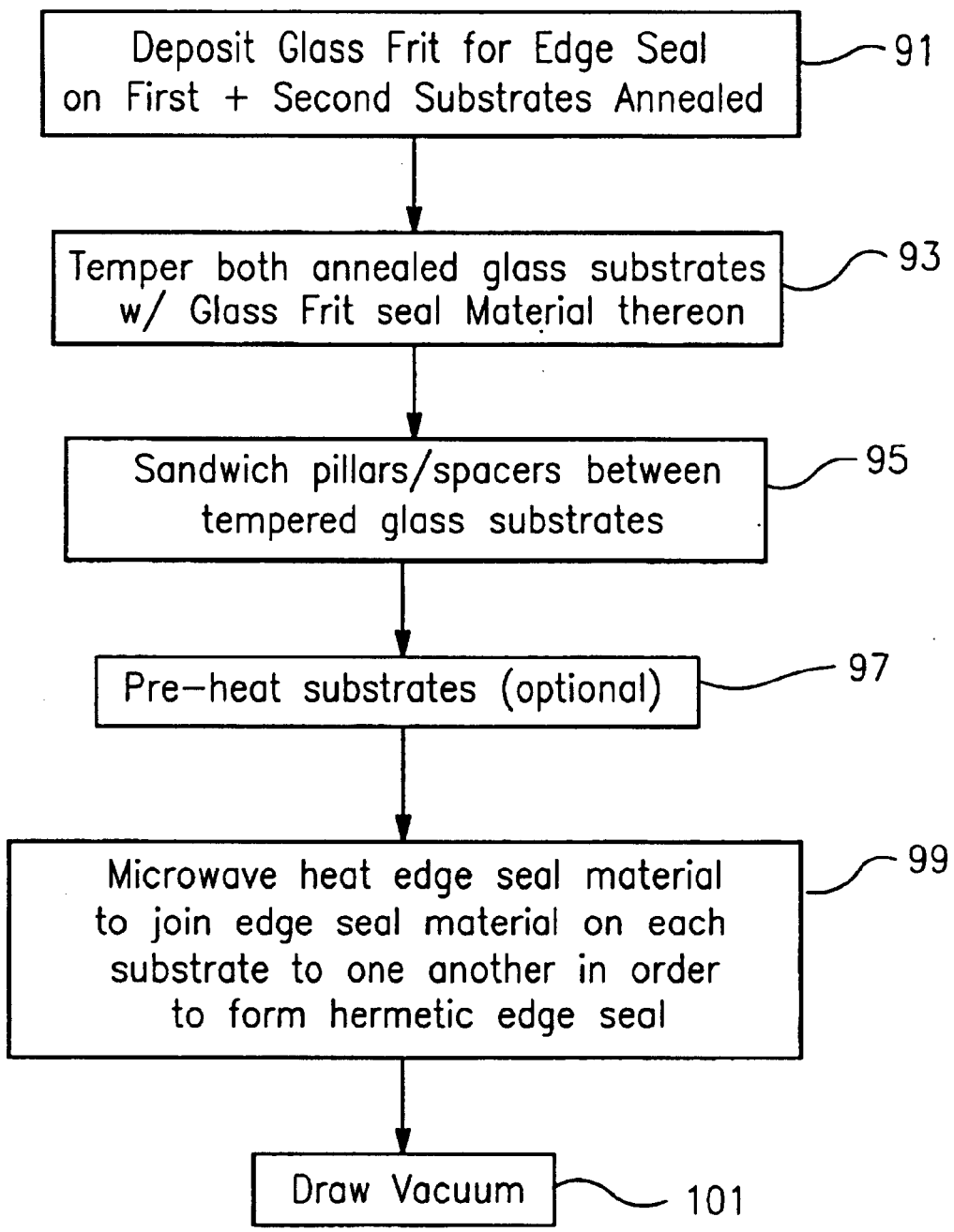

FIG. 11 is a flowchart illustrating certain steps taken during the manufacture of the VIG unit according to the FIG. 10 embodiment of this invention.

Figure 12:
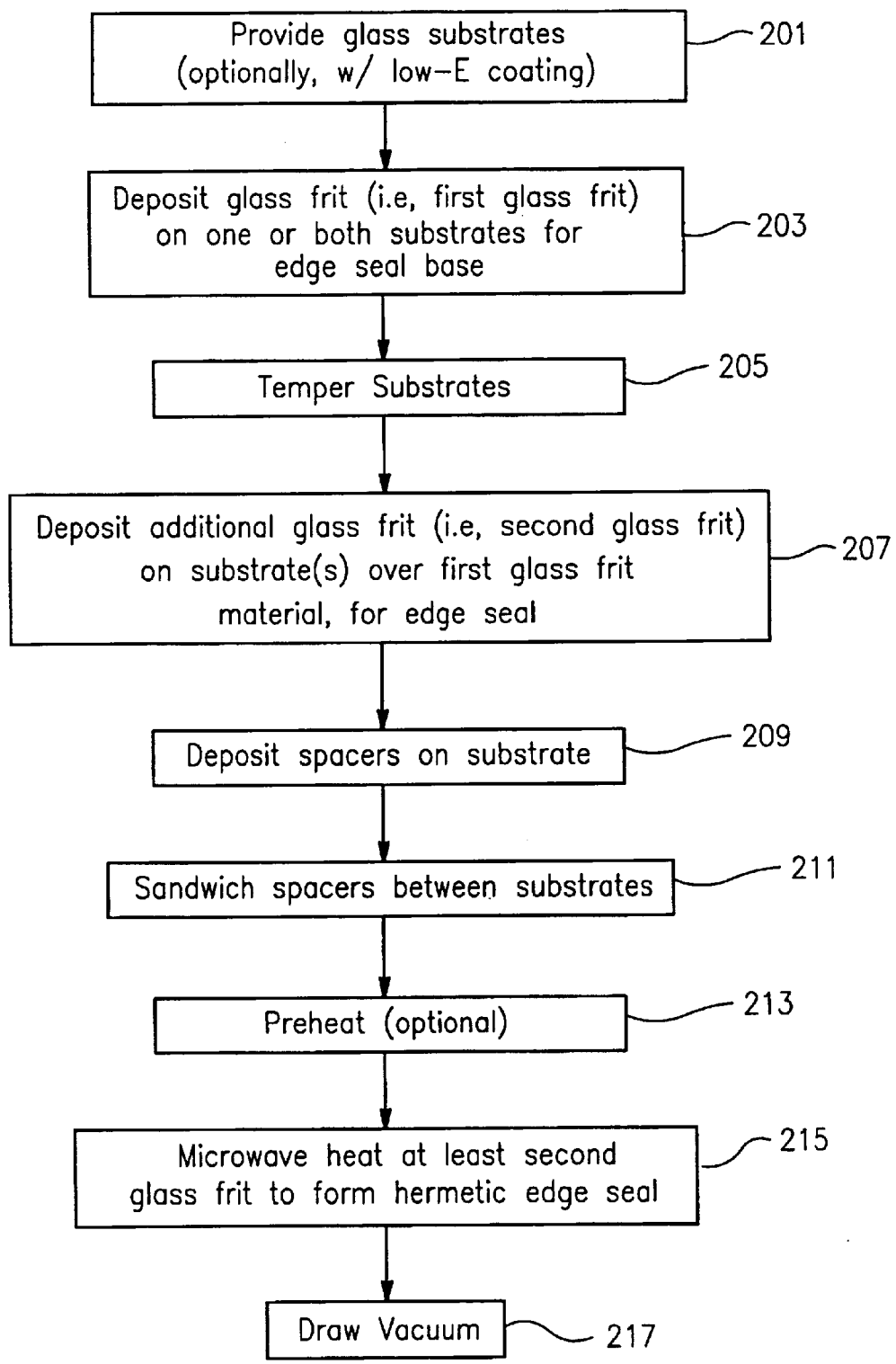

FIG. 12 is a flowchart illustrating certain steps taken during the manufacture of a VIG unit according to still another embodiment of this invention.

Figure 13A:
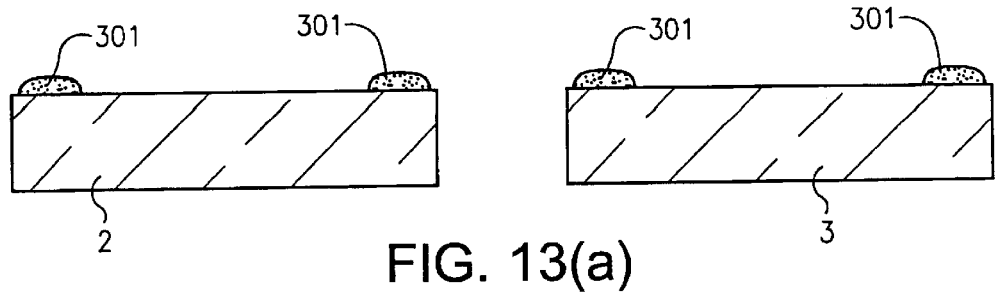
Figure 13B:
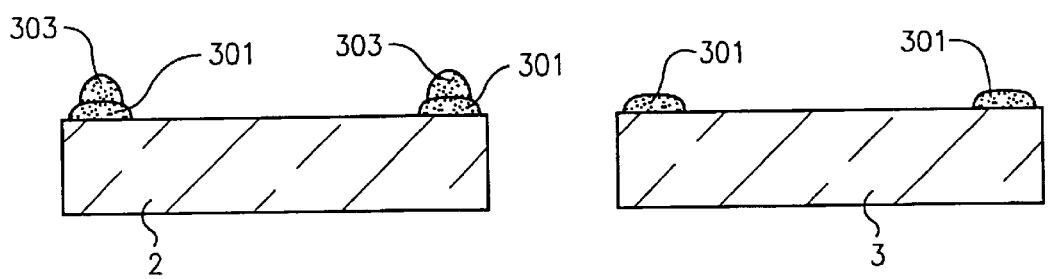
Figure 13C:
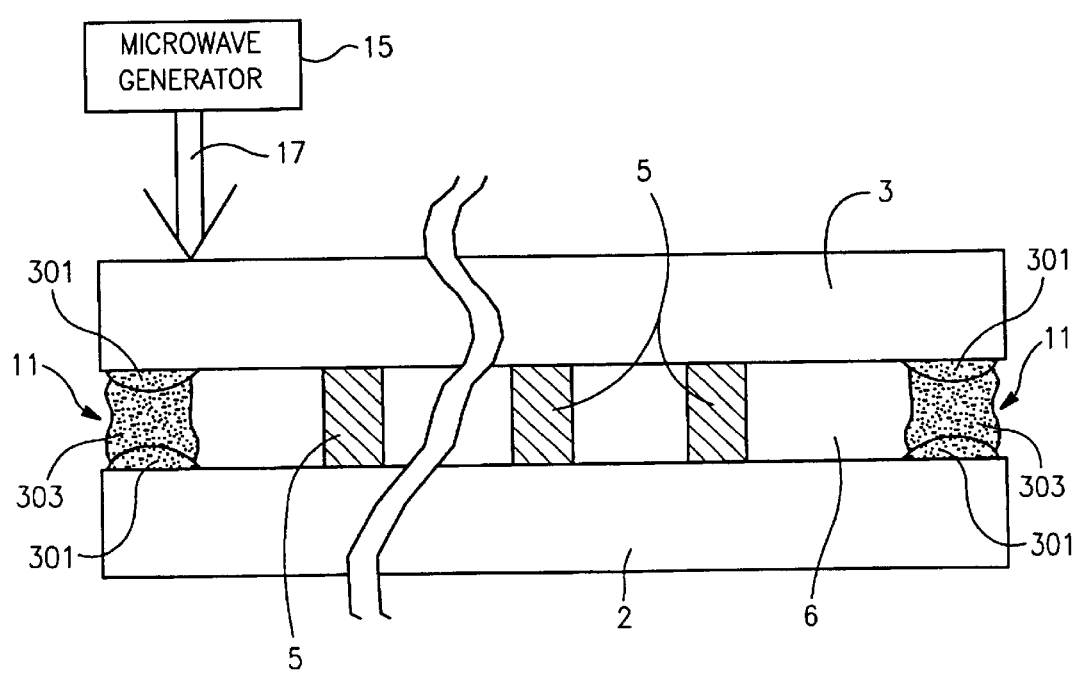

FIGS. 13(a) through 13(c) are side partial cross sectional views of components as the VIG unit is being manufactured in accordance with the FIG. 12 embodiment of this invention.

DETAILED DESCRIPTION OF CERTAIN EMBODIMENTS OF THIS INVENTION

Referring now more particularly to the accompanying drawings in which like reference numerals indicate like parts throughout the several views.

Certain embodiments of this invention relate to an improved peripheral or edge seal in a vacuum IG window unit, and/or a method of making the same. "Peripheral" and "edge" seals herein do not mean that the seals are located at the absolute periphery or edge of the unit, but instead mean that the seal is at least partially located at or near (e.g., within about two inches) an edge of at least one substrate of the unit.

Certain embodiments of this invention utilize microwave energy during the formation of an edge or other seal for a vacuum IG unit. In an exemplary embodiment, microwave energy may be used in order to cure edge seal material into a resulting edge seal (e.g., solder glass inclusive edge seal) in a vacuum IG unit. As will be explained more fully below, the use of microwave energy may enable at least portion(s) of one or more of the thermally tempered glass substrate(s) 2, 3 to retain more temper strength than they otherwise would during a conventional formation of a solder glass edge seal in a vacuum IG unit. Additionally, the use of microwave energy may reduce the likelihood of damage to an optional low-E coating(s) provided on one or more of the glass substrates. Still further, the use of microwave energy during formation of a solder glass edge seal may enable processing time to be reduced relative to conventional solder glass edge seal curing times. Thus, while tempered substrates 2, 3 are preferred, they are not necessary and non-tempered substrates 2, 3 may instead be used in certain alternative embodiments of this invention.

FIGS. 5, 6(c), 10(c), and 13(c) are cross-sectional views of thermally insulating glass panels according to different embodiments of this invention. Because interior space or cavity 6 between the opposing substrates is at a pressure lower than atmospheric in general, this type of panel is often referred to as a vacuum insulating glass (IG) unit having low pressure space 6. The vacuum IG unit or panel includes first glass substrate 2, second glass substrate 3, low pressure or evacuated space 6 provided between substrates 2 and 3, spacers/pillars 5 for spacing the substrates 2, 3 from one another and supporting them, optional pump out tube (not shown) disposed in a hole or aperture formed in one of the substrates for evacuating space 6, and peripheral or edge seal 11 that hermetically seals low pressure space 6 between substrates 2, 3. Hermetic edge seal 11 prevents air from entering space 6 and keeps the vacuum therein. Seal 11 in certain embodiments of this invention may be located in approximately the same location as edge seal 4 shown in FIG. 2. Any other suitable location is possible so long as a low pressure space 6 is sealed off between the substrates. Substrates 2, 3 are preferably thermally tempered glass, although they need not be tempered in all embodiments of this invention.

In certain embodiments of this invention, glass substrates 2, 3 may be approximately the same size. However, in other embodiments of this invention, one glass substrate 2 may be larger in size than the other glass substrate 3 in order to provide an approximately L-shaped step proximate an edge of the vacuum IG unit.

Vacuum IG units according to different embodiments of this invention may be used as residential or commercial windows. The evacuation of space 6 eliminates or reduces heat transport between glass substrates 2, 3 due to gaseous conduction and convection. In addition, radiative heat transport between glass sheets/substrates 2 and 3 can be reduced to a low level by providing an optional low emissivity (low-E) coating(s) on the internal surface of one or both substrates 2, 3. Such low-E coating(s) are typically edge deleted under edge seals, but need not be in certain embodiments of this invention. High levels of thermal insulation can thus be achieved. In certain embodiments, the pressure in space 6 is reduced to a level below about $10^{-2}$ Torr, more preferably below about 1.0 mTorr, or $10^{-3}$ Torr, and most preferably below about $10^{-4}$ Torr of atmospheric pressure. To maintain such pressures, the internal surfaces of glass substrates 2, 3 may be outgassed, and areas at or near the edges or peripheries of substrates 2, 3 hermetically sealed together by seal 11 in order to eliminate any ingress of gas or air.

As shown in FIGS. 5, 6(c), 10(c), and 13(c), an array of small, high strength support spacers or pillars 5 is provided between substrates 2 and 3 in order to maintain separation of the approximately parallel glass substrates against atmospheric pressure. It is often desirable for spacers 5 to be sufficiently small so that they are visibly unobtrusive. In certain embodiments, each pillar or spacer 5 may have a height of from about 0.20 to 1.0 mm, more preferably from about 0.20 to 0.40 mm. Spacers 5 may be made of solder glass, ceramic, metal, or any other suitable material in different embodiments of this invention. The may be dime-shaped, cylindrical in shape, round, or any other suitable shape in different embodiments of this invention.

Tempered glass sheets 2 and 3 are preferred for their mechanical and thermal strength. Tempered glass has been used traditionally in commercial applications where wind, snow or thermal loads exceed the strength capabilities of other glass and/or where tempered glass is mandated by code (e.g., safety glazings for entranceways, railings, or fire knock-out windows). In certain preferred embodiments of this invention, glass substrates 2 and/or 3 are thermally or heat tempered. By providing tempered glass substrates 2 and 3, the strength of the glass is increased. This may enable pillars to be spaced further apart, which increases stresses at the glass/pillar interface(s) but may potentially result in less pillars being utilized in the vacuum IG unit. Reduction in a number of pillars may enhance the thermal insulation properties of the vacuum IG unit and/or improve aesthetic characteristics of the unit. In preferred embodiments of this invention, the glass sheets 2, 3 are thermally tempered prior to their sandwiching of the spacers 5 therebetween.

According to certain embodiments of this invention, the glass used for substrates 2 and 3 is soda lime silica glass.

However, other types of glass, colored or clear, may also be used (e.g., borosilicate glass). Glass substrates 2 and/or 3 may be from about 2 to 6 mm thick in certain embodiments, preferably from about 3–5 mm thick each. However, when tempered, thinner glass sheets 2, 3 may be used (e.g., from about 2.5 to 4.0 mm thick). It is also possible to use plastic substrates 2, 3 in alternative embodiments of this invention.

According to preferred embodiments of this invention, solder glass edge seal 11 is formed at a location at least partially between substrates 2 and 3 through the use of at least microwave energy. The microwave energy is directed toward the edge seal material in order to cure the same into the resulting solder glass edge seal 11. In certain embodiments of this invention, the microwave energy may be directed toward localized areas of the vacuum IG unit where the edge seal is to be formed in order to avoid substantially heating central areas of the glass substrates 2, 3 so that at least certain portions (e.g., central portions) of the glass substrates can retain much of their original temper strength. In other embodiments of this invention, microwave energy sensitive additives or dopants may be provided in the edge seal material so that the edge seal material absorbs more microwave energy than do glass sheets 2, 3. Again, it is possible to heat the edge seal material and form hermetic solder edge seal 11 while at the same time enabling large portions of glass sheets 2, 3 (and potentially the entire substrates 2, 3) to retain much of their original temper strength.

FIGS. 6(*a*)–6(*c*) are side cross-sectional views illustrating steps taken during the manufacture of an exemplary vacuum IG unit according to a particular embodiment of this invention. Initially, first and second glass substrates 2, 3 are provided. At least one of the substrates is preferably thermally tempered, and both may be tempered in certain embodiments. As shown in FIG. 6(*a*), a plurality of spacers 5 and edge seal material 12 are deposited on a major surface of tempered glass substrate 2. Spacers 5 may be deposited before edge seal material 12, or vice versa.

According to an exemplary embodiment, glass frit suspended in a liquid or solvent is deposited around an edge of substrate 2 as edge seal material 12. The frit is known in the art as a particulate-like substance (e.g., pulverized, ground, or and/powdered glass). An exemplary solvent in which the glass frit may be suspended in edge seal material 12 is amyl acetate. Optionally, a binder such as methyl cellulose or nitrocellulose may be added to the solvent. Thus, according to one exemplary embodiment, the solder glass or edge seal material 12 deposited proximate the periphery of the major interior surface of substrate 2 may include about 90% glass frit powder, and 10% solution. In certain embodiments, material 12 may include from about 70–99% glass frit powder, and from about 1–30% solution. The solution may include, for example, 98.8% amyl acetate and 1.2% nitrocellulose (by weight). Other suitable solutions and/or ratios may of course be utilized instead, as the aforesaid materials and ratios are for purposes of example only. For example, frit powder Ferro 4000 (from Ferro Corp., Cleveland, Ohio) and binder/solvent F1016AJ (e.g., mixture of 85% Ferro 4000 and 15% by weight F1016AJ) may be used for the edge seal material to be deposited, and the same may be deposited on one of substrates 2, 3 via a syringe or any other suitable dispenser.

After the spacers 5 and edge seal material 12 have been provided on the surface of substrate 2, the other substrate 3 is brought down on top of spacers 5 and edge seal material 12 as shown in FIG. 6(*b*). At this point, primarily spacers 5 function to support substrate 3 above substrate 2. Optionally, a low-E coating or coating system 14 may be provided on an interior surface of substrate 3. Exemplary low-E coating systems 14 which may be used are disclosed in U.S. Pat. Nos. 5,557,462, 5,514,476, 5,425,861, and 5,800,933, the disclosures of which are all hereby incorporated herein by reference.

As shown in FIG. 6(*c*), microwave energy 17 is then directed toward the edge seal material 12 (e.g., through substrate 2 and/or 3) in order to heat and cure the same in order to form the resulting hermetic peripheral/edge seal 11. In this regard, the glass frit in edge seal material 12 is heated, melted and/or fused by the microwave energy which it absorbs and the solvent is driven off in order to form peripheral/edge seal 11 of solder glass which bonds to substrates 2, 3. Optionally, at least one dopant material(s) may be added to the edge seal material 12 in order to render the edge seal material more absorptive of the microwave energy (e.g., more absorptive of the microwave energy than the substrates 2, 3). For example, a dopant such as silicon carbide may be added to the edge seal material 12 in order to increase its microwave absorption relative to that of glass sheets 2, 3. While silicon carbide is a preferred dopant for increasing the microwave absorption of seal material 12, other suitable dopants (e.g., metals such as Al, Cu, Mg, alloys thereof, etc.) may instead be added to edge seal material 12 to increase its microwave absorption. In certain preferred embodiments, the dopant may represent from about 0–15% by weight of the edge seal material, more preferably from about 2–10%, and most preferably from about 5–8%.

As shown in FIG. 6(*c*), a localized beam 17 of microwave energy from microwave generator 15 may be directed only toward the area of the vacuum IG unit where hermetic peripheral/edge seal 11 is to be formed. In other words, microwave energy need not be directed toward a central area of the vacuum IG unit near the center or primary viewing area(s) of glass sheets 2, 3. In such a manner, microwave heating of the central portions of the vacuum IG unit can be avoided so that at least central portions of glass substrates 2, 3 can retain at least about 50% (and preferably more) of their original temper strength after the edge seal 11 has been formed. Microwave generator 15 may be robotically controlled to traverse the entire periphery and/or edge of the vacuum IG unit while directing beam 17 only at the area along the edge of the unit where seal 11 is to be formed thereby avoiding the direction of microwave energy toward and/or into central portions of the substrates 2, 3. Beam 17 may be in the form of a point-shaped beam for directing energy only at a specific point of the unit, or alternatively the beam 17 may be a linearly shaped beam so as to direct microwave energy at an area shaped in a linear and elongated manner (e.g., along a partial or entire edge of the unit).

Alternatively, instead of directing the microwave energy toward the vacuum IG unit in the form of a beam 17, the entire vacuum IG unit including the entireties of both substrates 2, 3, and seal material 12 may be passed through a microwave oven for the purpose of heating and forming hermetic edge seal 11. In such embodiments (and all other embodiments herein), at least one dopant (e.g., silicon carbide) may be added to the edge seal material 12 so as to render it more absorbing of microwave energy than glass substrates 2, 3. In such a manner, while the edge seal material 12 absorbs much microwave energy and fuses so as to form hermetic solder glass edge seal 11, substrates 2 and 3 do not absorb nearly as much microwave energy and are not heated as much as the edge seal material. This, for example, enables the substrates to be capable of retaining at least 50% (and preferably more) of their original temper strength. In still other embodiments of this invention, substantially the entire unit may be flooded with microwave energy (with use of a dopant in the edge seal material) for a period of about 10 seconds or less, in which case most of the thermal temper strength can be retained even after such microwaving.

While fused solder glass is a preferred material of edge seal 11 according to certain embodiments of this invention, other materials capable of forming a hermetic edge seal may instead be used. For example, hermetic edge seal 11 may be formed of indium, epoxy, or other suitable material in alternative embodiments of this invention (these materials also being exposed to the microwave energy in order to cure the same to form seal 11).

In preferred embodiments of this invention, the microwave energy 17 utilized to form hermetic edge seal 11 has a wavelength of from about 1–10 mm, more preferably from about 2–8 mm, and most preferably from about 2–5 mm. Wavelengths much higher than these are not easily absorbed by glass but could be utilized if sufficient dopant was provided in the edge seal material 12. Thus, while the aforesaid microwave wavelengths are preferred, they are not intended to be limiting unless specifically recited in the claims.

In an exemplary embodiment of this invention, microwave generator 15 may be a Gyrotron Beam Generator which may be obtained by Gyrotron Technologies, Inc., Bristol, Pa. However, as will be recognized by those of skill in the art, other suitable microwave generators may instead by used (e.g., directional beam microwave generators, oven type microwave generators, etc.).

As discussed above, a primary purpose of certain embodiments of this invention is to utilize microwave energy 17 which (i) heats edge seal material 12 in order to form hermetic peripheral/edge seal 11, while (ii) not substantially heating certain portions (e.g., central portions) of the glass substrate(s) 2, 3 so as to not adversely affect the temper strength of substrates 2 and 3 to any significant degree. Thus, at least certain portions of substrates 2 and 3 (and potentially the entire substrates) preferably retain at least about 50% of their original temper strength after hermetic edge seal 11 has been formed, more preferably at least about 60% of their original temper strength, even more preferably at least about 70% of their original temper strength, and most preferably at least about 80% of their original temper strength. This may be achieved by directing the microwave energy 17 in a localized manner only at the area (e.g., near a periphery) of the vacuum IG unit where the edge seal 11 is to be formed so as to prevent or reduce the likelihood of central portions of glass substrates 2, 3 absorbing significant microwave energy. Alternatively, this may be achieved by using an edge seal material 12 (e.g., glass frit in a solvent with dopant) which tends to absorb significantly more microwave energy than do substrates 2, 3. In any event, hermetic edge seal 11 is formed without significant deterioration of the temper strength of at least certain portions (e.g., central portions) of the glass substrates 2, 3.

In certain embodiments of this invention, each area of edge seal material 12 is heated with microwave energy for a limited period of time in order to form hermetic seal 11. For example, in one embodiment each area of edge seal material 12 may be heated with microwave energy for a time of from about 1–60 seconds, more preferably from about 1–30 seconds. However, depending upon the edge seal material being used, the exposure time may vary and may last for minutes in other embodiments. However, it is noted that when appropriate edge seal materials are utilized, the processing time for forming hermetic edge seal 11 can be reduced relative to that of the prior art.

FIG. 7 is a flow chart illustrating certain steps taken in the manufacture of a vacuum IG unit of FIGS. 5–6 according to an exemplary embodiment of this invention. Initially, the glass substrates 2, 3 are provided (step 21). The glass substrates 2, 3 are preferably thermally tempered (step 23). Optionally, a low-E coating or coating system 14 may be provided on at least one of the substrates 2, 3 (step 25), either before tempering or after tempering in different embodiments. Spacers 5 and edge seal material 12 (e.g., glass frit suspended in liquid or solvent) is deposited around an edge or periphery of a major surface of the first substrate 2 (step 27) (e.g., see the location of seal 4 in FIG. 2). The glass with frit on it may optionally be heated at this point to about 120 degrees C. for about 15 minutes to evaporate the solvent of the deposited seal material. The second substrate 3 is then brought down over the first substrate so as to sandwich the spacers 5 and seal material 12 therebetween (step 29), with a pressure of e.g., about 0.15 psi all around or everywhere. Optionally, the unit including the substrates 2, 3, spacers 5, and edge seal material 12 may be pre-heated to a temperature of from about 100–250° C., more preferably about 200° C. for about 60 minutes, in order to prevent thermal shock in the glass during the subsequent microwaving step (step 31). Also, step 31 may function to help the seal material fuse with the glass substrates by heating the substrates, and/or may enable binder to burn off for hermeticity purposes. Optionally, the oven temperature may be raised to about 430 degrees C. at this point, letting the stack remain at that temperature for about 60 minutes. The edge seal material 12 may be heated via microwave energy as discussed above in order to form hermetic peripheral/edge seal 11 (step 33). The oven cooling rate may then be set to about 2.8 degrees C. per minute to allow the stack to cool, while lowering the oven temperature to about 310 degrees C. and letting it at that temperature for about 30 minutes during the cooling process. The stack may then be permitted to cool at room temperature at its own rate, roughly 2 degrees C. per minute. Thereafter, a vacuum is drawn (e.g., via a pump out tube located at any suitable position on the unit) in order to form low pressure space or cavity 6 between the substrates (step 35).

FIG. 8 is a cross sectional view illustrating that a solder glass seal 41 around a hollow pump-out tube 43 may also be formed using microwave energy 17 from a microwave generator 15 as described above. This embodiment is the same as the embodiment of FIGS. 1–7, except that the seal material heated with the microwave energy is a seal material provided around at least a portion of a pump-out tube 43. After formation of the hermetic seal 41, the central cavity between the glass substrates 2, 3 may be evacuated by drawing a vacuum out of the cavity via tube 43 as shown in FIG. 8 so as to create low pressure space 6. The formation of a pump-out tube seal 41 using microwave energy may be done either in combination with or separately from formation of an edge seal using microwave energy in different embodiments of this invention.

FIG. 9 is a flowchart illustrating steps that may be taken according to yet another embodiment of this invention. The FIG. 9 embodiment is similar to the FIG. 7 embodiment, with a few notable exceptions. For example, substrate(s) 2, 3 are originally provided in the FIG. 9 embodiment with a low-E coating thereon (step 51). The edge seal material 12 is then deposited around an edge portion of one of the substrates prior to tempering (step 53). Thereafter, one or both of the substrates is/are tempered along with the edge seal material thereon (step 55). During the tempering step, the edge seal material is caused to fuse with the glass substrate upon which it is provided. Then, spacers 5 are deposited on one of the substrates 2, 3 (step 57). The two substrates 2, 3 are brought together with spacers 5 therebetween (step 59). Unlike the FIG. 7 embodiment, at this point the edge seal material may be in a hardened state. Thereafter, microwave energy described above is used to heat the edge seal material in order to melt at least a portion of the same in order to for the hermetic edge seal (step 61). As mentioned above, a hermetic seal around the pump-out tube may optionally be formed using microwave energy as well. Thereafter, a the space between the substrates 2, 3 is evacuated so as to form low pressure space 6 (step 63).

FIGS. 10–11 illustrate another embodiment of this invention. According to the FIGS. 10–11 embodiment, edge seal material is deposited around the entire periphery of one (or preferably both) of annealed glass substrates 2 and 3 prior to thermal tempering of the substrates. Then, the substrates 2, 3 with edge seal material thereon are thermally tempered. Following tempering, the substrates are brought together so as to sandwich spacers therebetween and microwave energy is used as described above in order to heat the edge seal material on one or both substrates thereby causing the edge seal material to fuse together so as to form the hermetic edge seal of the vacuum IG unit. This embodiment may be considered as an improvement over the FIGS. 5–8 embodiments of this invention because diffusion of the edge seal material into a tempered glass substrate is more difficult than diffusion of the edge seal material into an annealed non-tempered glass substrate. Thus, by heating the edge seal material and causing it to diffuse into the substrates during the thermal tempering process, improved bonding of the edge seal material to the respective substrates may be achieved. The likelihood of glass cracking may also be reduced in accordance with this embodiment.

Referring more specifically to FIGS. 10–11, a more detailed description of this embodiment follows. Initially, first and second annealed non-tempered glass substrates 2, 3 are provided. Optionally, a low-E coating or coating system 14 may be provided on at least one of the substrates 2, 3. Edge seal material 12 (e.g., glass frit suspended in liquid or solvent) is deposited around an edge or periphery of a major surface of at least the first substrate 2 and preferably also the second substrate 3 (see FIG. 10(*a*), and step 91 in FIG. 11; also, see the location of seal 4 in FIG. 2). Seal material may either be deposited directly on a surface of a substrate 2, 3, or alternatively but not preferably may be deposited on the substrate 2, 3 with another layer(s) therebetween. Then, the glass substrate(s) 2, 3 with edge seal material 12 thereon are thermally tempered so as to diffuse the seal material 12 into the respective glass substrates thereby forming hardened seal portions 12*a* as shown in FIG. 10(*b*) (step 93 in FIG. 11). This thermal tempering, in certain exemplary embodiments, may be conducted at a temperature of from about 600–700 degrees C. Thus, the heat utilized during the thermal tempering process both tempers the glass substrates 2 and 3, and also causes the seal material 12 to diffuse into the respective substrates to form cured solder glass seal portions 12*a*. The substrates are permitted to cool in accordance with conventional tempering techniques. Then, second substrate 3 with seal portion 12*a* thereon is then brought down over the first substrate 2 with seal portion 12*a* thereon so as to sandwich the spacers 5 and seal material portions 12*a* therebetween (see FIG. 10(*b*), and step 95 in FIG. 11). Optionally, the unit including the substrates 2, 3, spacers 5, and edge seal material 12 may be pre-heated at this point to a temperature of from about 100–250° C., more preferably about 200° C. for about 60 minutes, in order to prevent thermal shock in the glass during the subsequent microwaving step (step 97). The edge seal portion(s) 12*a* may then be re-heated via microwave energy as discussed above in order to re-melt the edge seal material thereby forming hermetic peripheral/edge seal 11 as shown in FIG. 10(*c*) (step 99). This embodiment may require more microwave energy than the previous embodiment due to the need for re-melting of the edge seal material. The stack may then be permitted to cool. Thereafter, a vacuum is drawn (e.g., via a pump out tube located at any suitable position on the unit) in order to form low pressure space or cavity 6 between the substrates (step 101).

FIGS. 12–13 illustrate another embodiment of this invention. This embodiment differs from previous embodiments in that first and second different applications of glass frit in solution are utilized during the manufacturing process. The first frit application (of a first viscosity) is applied prior to thermal tempering of the substrates. This glass frit is bonded to or fused into the glass (one or both of the substrates) either during the thermal tempering process or prior thereto during a separate heating step. The second frit application (of a second viscosity) is applied after tempering over the first frit application on at least one of the two substrates. The two frit applications may be of approximately the same viscosity in certain embodiments, and in other embodiments the second application is of a higher viscosity than the first application so that the second application is more paste-like. After the two substrates are brought together so as to sandwich the spacers 5 therebetween, the second frit application is heated (e.g., via microwave energy, or any other suitable energy) when it is in contact with the first frit from both substrates, thereby causing the second frit application to bond or adhere to the first frit applications. After curing, the hermetic edge seal 11 results.

Referring more particularly to FIGS. 12 and 13, two float glass substrates 2 and 3 are provided (with or without low-E coating(s) thereon) (step 201). A first application of glass frit in solution 301 (e.g., Ferro 4000 frit in solution, where the solution is typically used for automotive windshield blackborder applications and is obtainable from O. Hommel Co., Carnegie, Pa. (the black pigment and glass frit may be deleted from this with Ferro 4000 then added to it)) is applied to a major surface of each of the two substrates proximate an edge portion thereof as shown in FIG. 13(*a*) (step 203). This first application 301 of glass frit material constitutes an edge seal base material, and may be located in the same location as the edge seal in FIG. 2 or anywhere else proximate the peripheral edge of the substrate(s). First application 301 of frit in solution may be from about 0.01 mm to 0.10 mm thick on each of the two substrates 2, 3 in certain exemplary embodiments of this invention. A preferred thickness is from about 0.03 mm to 0.08 mm. These frit 301 painted substrates may then be dried in an oven (e.g., at from about 80–200 degrees C., more preferably at about 120 degrees C.) for a period of from about 1 to 5 hours (e.g., preferably about 2.5 hours). Thus, in certain embodiments, the frit 301 may be fused or bonded to the underlying substrate(s) in a separate heating step before the tempering process begins (however, this bonding may also be done primarily during the tempering heating process in other embodiments).

The frit 301 painted substrates of FIG. 13(*a*) are then thermally tempered in a known manner (e.g., using temperatures of from about 600–700, or 600–800, degrees C.) as discussed above (step 205). During tempering (and/or prior thereto as discussed above), the frit 301 fuses into and/or bonds with the underlying substrate(s) 2, 3. The tempered substrates with solder glass/glass frit 301 thereon may optionally be cleaned using hot water and/or soap, and/or then rinsed with distilled water. The tempered substrates with frit layer 301 thereon may then optionally be dehydrated (e.g., on a 120 degree C. plate for five minutes).

Following tempering, FIG. 13(b) illustrates that the second glass frit application 303 is applied at least partially over the cured first glass frit or solder glass 301 on at least one of the substrates (step 207). In FIG. 13(b), the second glass frit in solution application 303 is only provided over solder glass 301 on one of the two substrates, although it may be applied in a similar manner on both substrates in alternative embodiments of this invention. For the second application, Ferro 4000 may be in F-1016AJ solution obtained from Pierce & Sevens, Buffalo, N.Y. As applied, the second glass frit 303 has a higher viscosity than the first glass frit 301 in certain embodiments of this invention (this has been found to help limit flow of the second application 303 thereby enabling easier alignment of the two portions 301 during the later sandwiching step. This second glass frit layer 303 application may then optionally be dried (e.g., on a 120 degree C. hot plate for five minutes). Spacers 5 are deposited on a substrate 2, 3 having both frit applications thereon (step 209).

FIG. 13(c) illustrates that the two substrates 2, 3 are then brought together so as to sandwich spacers 5 and the two glass frit applications/layers therebetween (step 211). During this step, the second glass frit layer 303 ends up being in contact with layer 301 of on each substrate 2, 3 as shown in FIG. 13(c). Optionally, the unit may then be preheated to a temperature of at least about 200 degrees C., more preferably of at least about 300 degrees C., and even to a temperature of about 380 degrees C. (step 213). Microwave energy 17 from at least one source 15 as described above in other embodiments of this invention is then used to heat at least the edge seal area (and thus frit layers 301 and 303) thereby melting the frit of 303 and causing it to fuse into and/or bond with pre-fired frit or solder glass 301 (step 215). This microwave energy may be used to heat the material 303 to a temperature of at least about 350 degrees C., more preferably to a temperature of at least about 400 degrees C., and most preferably to a temperature of from about 400 to 500 degrees C. for a period of time of from about 0.05 to 15.0 minutes. This heating causes the frit/glass layer 303 to bond with frit/glass layers 301. After cooling (in ambient conditions or otherwise) down (e.g., to room temperature), the hermetic edge seal 11 has been formed. The space/gap between the substrates is then evacuated to create low pressure space 6 (step 217).

Regarding then FIGS. 12–13 embodiment, it has surprisingly been found that this technique results in a significantly stronger vacuum IG unit than has been previously achievable with standard solder glass edge seals shown in FIGS. 1–2 above. For example, a conventional design with a solder glass edge seal like that of FIGS. 1–2 experienced wedge test (pushing a wedge between the substrates) failure at 1.99 lbf (pounds force) and a sheer failure at 190 lbf. In contrast, an example of the embodiment of FIGS. 12–13 did not experience wedge test failure until 3.75 lbf (cohesive failure) and sheer failure at 225.8 lbf. Thus, it can be seen that the maximum load is distributed much more uniformly in the FIGS. 12–13 embodiment than in FIG. 6(c). The FIGS. 12–13 embodiment is stronger than the FIGS. 1–2 embodiment (with approximately the same uniformity however). Accordingly, this embodiment of this invention provides a better uniformity in the final hermetic edge seal 11.

It is also noted that an example of the FIG. 6 embodiment of this invention experienced wedge test failure at 2.5 lbf and shear failure at 171.5 lbf. Thus, it can be seen that the FIG. 6 embodiment of this invention surprisingly results in a stronger and better overall edge seal than the prior art of FIGS. 1–2, but not quite as good as the FIGS. 12–13 embodiment of this invention.

Once given the above disclosure, many other features, modifications, and improvements will become apparent to the skilled artisan. Such other features, modifications, and improvements are therefore considered to be a part of this invention, the scope of which is to be determined by the following claims.

What is claimed is:

1. A method of in making a thermally insulating glass panel, the method comprising:

depositing a first portion of edge seal material on first and swami glass substrates;

thermally tempering the first and second glass substrates with the first portion of edge seal material thereon;

following said tempering, depositing a second portion of edge seal material on at least first substrate over at least part of the first portion of edge seal material already on the first substrate, wherein at least one of the edge seal material(s) is doped with a material so that it is more absorbing of microwave energy from 2–8 mm:

forming a hermetic peripheral or edge seal at least partially between the first and second substrates by at least using microwave energy comprising a wavelength(s) of from 2–8 mm directed toward at least the second portion of edge seal material so that the second portion of edge seat material bonds to both: a) the first portion of edge seal material on the first substrate, and b) the first portion of edge seal material on the second substrate; and evacuating a space between the first and second substrates so as to form a low pressure area having a pressure less than atmospheric pressure between the first and second substrates.

2. The method of claim 1, wherein said forming a hermetic peripheral or edge seal using at least microwave energy is carried out in a manner so that after the hermetic edge seal has been formed at least certain portions of the first and second substrates retain at least about 50% of their original temper strength.

3. The method of claim 2, wherein at least certain portions of the first and second substrates retain at least about 70% of their original temper strength after the hermetic edge seal has been formed.

4. The method of claim 3, wherein at least certain portions of the first and second substrates retain at least about 80% of their original temper strength after the hermetic edge seal has been formed, and wherein the method further comprises heating the first portion of edge seal material prior to said tempering in order to cause the first portion of edge seal material to bond to said substrates prior to said tempering.

5. The method of claim 1, wherein said tempering comprises healing said glass substrates with the first portion of edge seal material thereon to a temperature of from about 600–700 degrees C. so that at least a portion of edge seal material is at least partially diffused into one of the substrates during the tempering.

6. The method of claim 1, wherein said forming a hermetic peripheral or edge seal at least partially between the first and second substrates using microwave energy comprises directing microwave energy in the form of a beam toward an edge or peripheral portion of at least one of the substrates to the exclusion of at least a central portion of said at least one substrate in order to form the hermetic edge seal.

7. The method of claim 6, wherein the edge seal is of a material more absorptive to certain wavelengths of microwave energy than is glass of the substrates.

8. The method of claim 1, further comprising providing a plurality of spacers between the first and second substrates, and wherein said first portion of edge seal material comprises solder glass or glass frit.

9. The method of claim 8, further comprising providing a low-E coating or coating system on at least a portion of an interior major surface of at least one of the first and second substrates.

10. A method of making a seal of a thermally insulating glass panel, the method comprising:
  thermally tempering a glass substrate with edge seal material thereon;
  providing additional edge seal material on said substrate following said
  tempering, so that ha additional edge seal material contacts the edge seal material provided or deposited on the glass substrate prior to said tempering;
  providing a plurality of spacers between the tempered glass substrate and another glass substrate;
  forming a seal located at least partially between the substrates by heating at least the additional edge seal material using at least microwave energy comprising a wavelength(s) of from 1–10 mm so that the additional edge seal material fuses with or bonds to the edge seal material deposited on the glass substrate prior to said tempering; and
  wherein at least some of said edge seal material is doped with a dopant to that the edge seal material is more absorbing of microwave energy from 1–10 mm so that more microwave energy is absorbed by the edge seal material and less by the glass substrate to that the glass substrate can retain more temper strength.

11. The method of claim 10, wherein the seal is a solder glass inclusive seal, and where the method further comprises:
  evacuating a space between the substrates so as to form a vacuum or low pressure area having a pressure less than atmospheric pressure between the substrates; and
  wherein said heating comprises using microwave energy to heat both the additional edge seal material and the edge seal material deposited on the glass substrate prior to said tempering so that the additional edge seal material fuses with or bonds to the edge seal material deposited on the glass substrate prior to said tempering.

12. The method of claim 10, wherein at least certain portions of the glass substrate retains at least about 70% of its original temper strength after the seal has been formed; and
  wherein the edge seal material provided on the glass substrate during said tempering fuses into or with the glass substrate during at least one of: (a) said tempering, or (b) during a separate heating step carried out prior to said tempering.

13. A method of making a seal, the method comprising:
  at least partially tempering a first substrate with a first application of seal material thereon; and
  following said tempering, adding a second application of seal material and using microwave energy to heat the first and second applications of seal material in order to form a seat at least partially located between the first substrate and a second substrate.

14. The method of claim 13, further comprising:
  providing a plurality of spacers between the substrates;
  wherein the seal is a hermetic edge seal; and
  evacuating a space between the first and second substrates so as to form a vacuum or low pressure area having a pressure less than atmospheric pressure between the first and second substrates.

15. A method of making a seal for a thermally insulated panel, the method comprising:
  heating a first glass substrate with base seal material thereon to a temperature of from about 600–700 degrees C.;
  following said heating, applying additional seal material and using microwave energy to re-heat the base seal material and heat the additional seal material in order to form a seal at least partially locates between the first substrate and a second substrate; and
  wherein at least some of said seal material is doped so that the seal material is more absorbing of microwave energy so that more microwave energy is absorbed by the seal material and less by the glass substrate so that the glass substrate can retain more temper strength.

16. The method of claim 15, wherein the base seal material and the additional seal material both comprise solder glass or glass frit, and the first and second substrates are glass substrates.

17. A method of making a thermally insulating unit, the method comprising:
  providing first and second substrates with a plurality of spacers therebetween;
  forming a hermetic peripheral or edge seal at least partially between the first and second substrates using at least microwave energy; and
  wherein said seal is doped with silicon carbide so that the seal is more absorbing of microwave energy.

18. The method of claim 17, further comprising evacuating a space between the first and second substrates.

19. method of making a seal of a thermally insulating glass panel, the method comprising:
  heating a glass substrate with edge seal material thereon;
  providing additional edge seal material on said substrate following said heating, so that the additional edge seal material contacts the edge seal material provided or deposited on the glass substrate prior to said heating;
  providing a plurality of spacers between the glass substrates by performing another heating in order to heat at least the additional edge seal material so that the additional edge seal material fuses with or bonds to the edge seal material deposited on the glass substrate prior to said previous heating, and wherein at least part of the seal material is doped with silicon carbide so that the seal is more absorbing of microwave energy.

20. A method of making an insulating glass (IG) window unit, the method comprising:
  providing first and second glass substrates, at least one of said glass substrates being tempered;
  depositing edge seal material on at least one of the glass substrates;
  forming at least part of an edge seal at least partially between the first and second glass substrates by at least using microwave energy comprising wavelength(s)

from 2–8 mm directed toward at least part of the edge seal material, wherein the seal material is doped with a material so that the seal material is more absorbing of microwave energy from 2–8 mm; and wherein at least one spacer is provided between the glass substrate for spacing the substrates from one another.

21. The method of claim 20, wherein said forming is carried out in a manner so that after the edge seal has been formed at least certain portions of the tempered glass substrate(s) retains at least about 50% of its original temper strength after the edge seal has been formed.

22. The method of claim 20, wherein said forming is carried out in a manner so that after the edge has been formed at least certain portions of the tempered glass substrate(s) retains at least about 70% of its original temper strength after the edge seal has been formed.

23. The method of claim 20, wherein said forming its carried out in a manner so that after the edge seal has been formed at least certain portions of the tempered glass substrate(s) retains at least about 80% of its original temper strength after the edge seal has been formed.

24. The method of claim 20, wherein said forming using microwave energy comprises directing microwave energy having a wavelength of from about 1–10 mm toward the edge seal material in order to form a hermetic edge seal.

25. The method of claim 20, wherein a plurality of spacers are provided between the first and second glass substrates, and wherein a space between the substrates is evacuated to a pressure less than atmosphere.

26. A method of making an insulating glass (IG) window unit, the method comprising:

providing first and second glass substrates;

depositing edge seal material on at one of the glass substrates;

forming at least part of an edge seal at least partially between the first and second glass substrates by at least using microwave energy directed toward at least part of the edge seal material, and wherein the seal material is doped with at least a carbide material so that the seal material is more absorbing of microwave energy from at least 2–8 mm.

* * * * *